(12) United States Patent
Sakata

(10) Patent No.: US 7,066,467 B2
(45) Date of Patent: Jun. 27, 2006

(54) SEALING DEVICE FOR WATER PUMP BEARINGS

(75) Inventor: Yoshizumi Sakata, Ikoma-gun (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 10/203,599

(22) PCT Filed: Dec. 28, 2001

(86) PCT No.: PCT/JP01/11688
§ 371 (c)(1),
(2), (4) Date: Aug. 12, 2002

(87) PCT Pub. No.: WO02/053930
PCT Pub. Date: Jul. 11, 2002

(65) Prior Publication Data
US 2003/0001341 A1 Jan. 2, 2003

(30) Foreign Application Priority Data
Dec. 28, 2000 (JP) .............................. 2000-400178

(51) Int. Cl.
F16J 15/32 (2006.01)
F16J 15/447 (2006.01)
(52) U.S. Cl. .................. 277/351; 277/423; 277/571
(58) Field of Classification Search ................ 277/551, 277/571, 572, 412, 423, 568, 351, 349
See application file for complete search history.

(56) References Cited

U.S. PATENT DOCUMENTS

| | | | |
|---|---|---|---|
| 2,819,100 A * | 1/1958 | Peterson | 277/421 |
| 3,021,161 A * | 2/1962 | Rhoads et al. | 277/568 |
| 3,341,265 A * | 9/1967 | Paterson | 384/486 |
| 3,459,431 A * | 8/1969 | Baker | 277/351 |
| 3,479,728 A * | 11/1969 | Micai et al. | 29/450 |
| 3,510,138 A * | 5/1970 | Bowen et al. | 277/571 |
| 3,606,352 A * | 9/1971 | Lutz | 277/568 |
| 3,682,488 A * | 8/1972 | Matsushima | 277/551 |
| 3,854,734 A * | 12/1974 | West | 277/565 |
| 4,639,149 A * | 1/1987 | Bras et al. | 384/477 |
| 4,765,761 A * | 8/1988 | Umezaki | 384/484 |
| 4,770,424 A * | 9/1988 | Otto | 277/351 |
| 5,183,269 A * | 2/1993 | Black et al. | 277/349 |
| 5,201,529 A * | 4/1993 | Heinzen | 277/351 |

(Continued)

FOREIGN PATENT DOCUMENTS

JP 66531 6/1981

(Continued)

Primary Examiner—Alison K. Pickard
(74) Attorney, Agent, or Firm—Jordan and Hamburg, LLP

(57) ABSTRACT

A sealing device for a water pump bearing employs a seal member without an axial lip, and having only a radial lip. The sealing device includes an annular seal member which is fixed to a shoulder portion of one end in an axial direction of an outer race of a water pump bearing and an annular slinger which is positioned on a side of the one end in the axial direction with respect to the seal member and externally fixed to the outer peripheral face of a pump shaft serving as an inner race. The seal member has a section shape which is bent along a disk portion and an outer cylindrical portion of the slinger. A labyrinth seal portion is formed between the seal member, and the disk portion and the outer cylindrical portion of the slinger. Radial lips are formed on an inner periphery of the seal member.

16 Claims, 7 Drawing Sheets

U.S. PATENT DOCUMENTS

| | | | |
|---|---|---|---|
| 5,350,181 A * | 9/1994 | Horve | 277/559 |
| 5,398,942 A * | 3/1995 | Duckwall et al. | 277/353 |
| 5,419,642 A * | 5/1995 | McLarty | 384/486 |
| 5,522,600 A * | 6/1996 | Duckwall | 277/402 |
| RE35,309 E * | 8/1996 | Matsushima et al. | 277/351 |
| 5,895,052 A * | 4/1999 | Drucktenhengst et al. | 277/351 |
| 6,485,256 B1 * | 11/2002 | Iketani | 415/113 |
| 6,845,986 B1 * | 1/2005 | Hood et al. | 277/409 |

FOREIGN PATENT DOCUMENTS

| JP | 48424 | 4/1992 |
|---|---|---|
| JP | 9-21397 | 1/1997 |
| JP | 2004-340210 | * 12/2004 |

\* cited by examiner

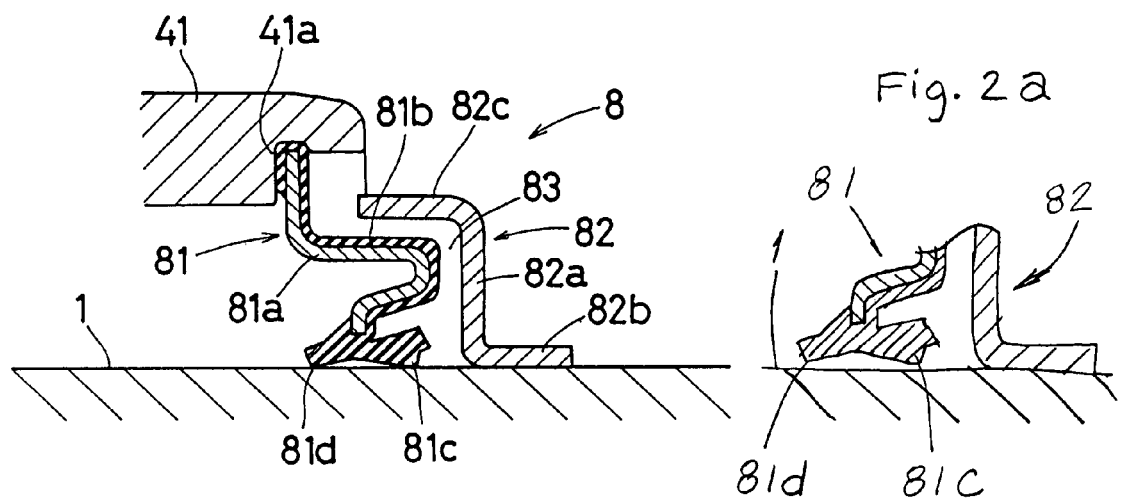
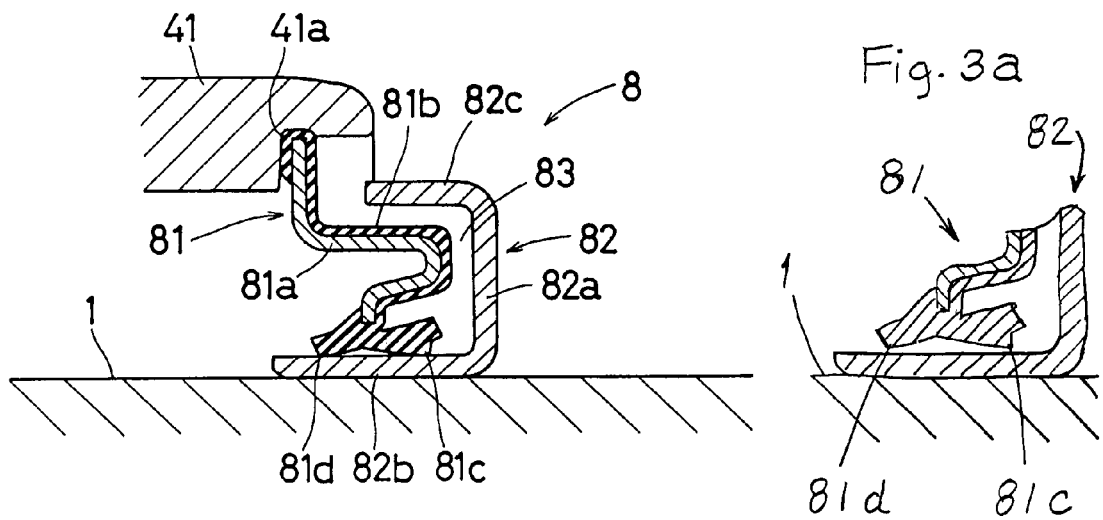

SEALING DEVICE FOR WATER PUMP BEARINGS

BACKGROUND OF THE INVENTION

The present invention relates to a sealing device for a water pump bearing.

For example, a structure such as shown in FIG. 8 is known as a water pump for circulating cooling water in an automobile engine, or the like.

The water pump comprises a pump shaft 1, an impeller 2, a mechanical seal 3, a water pump bearing 4, sealing devices 5 and 6 for the water pump bearing, a pulley 7, etc. The impeller 2 is attached to one end of the pump shaft 1, and the pulley 7 is attached to the other end. The pump shaft 1 and the impeller 2 are rotated by a belt (a belt which transmits rotation of a crankshaft of an engine) which is wound around the pulley 7, so that cooling water in a pump chamber is sent out.

In the water pump bearing 4, the pump shaft 1 is used as an inner race, and an outer race 41 is externally attached to the outer peripheral face of the inner race via a cylindrical roller group 42 and a ball group 43 serving as rolling elements. The bearing 4 is disposed in a boss portion 10 of a pump housing.

The sealing device 5 which is disposed on the side of one end (on the side of the impeller) in the axial direction of the water pump bearing 4 performs a sealing action so that, even when the cooling water in the pump chamber leaks from the mechanical seal 3, the cooling water does not enter the interior of the water pump bearing 4, thereby allowing the leaking cooling water to be discharged to the outside through a drain hole 111 of the boss portion 10. The sealing device 5 is configured by an annular seal member 51 and an annular slinger 52.

The seal member 51 of the sealing device 5 is fixed to a shoulder portion of one end in the axial direction of the outer race 41, and, as enlargedly shown in FIG. 9, configured by integrally heat bonding an elastic member 51b in which two radial lips 51c and 51d, and one axial lip 51e are formed, and which is made of synthetic rubber or the like, to an annular core 51a. By contrast, the slinger 52 is positioned on the side of the one end (on the side of the impeller) in the axial direction with respect to the seal member 51, and externally fitted and fixed to the outer peripheral face of the pump shaft 1. The axial lip 51e of the seal member 51 is in contact with a disk portion 52a of the slinger 52. The two radial lips 51c and 51d of the seal member 51 are in contact with the outer peripheral face of the pump shaft 1.

In the sealing device 5 of the water pump bearing 4 which is on the side of the impeller, the seal performance is improved by using the seal member 51 of the triple lip type in which the two radial lips 51c and 51d and the one axial lip 51e are disposed. However, the seal member 51 of the triple lip type configured as described above has a complicated structure because it has the axial lip 51e, thereby producing a problem in that the cost is increased.

The invention has been conducted in order to solve the aforementioned problem. It is an object of the invention to provide a sealing device for a water pump bearing which can exhibit excellent seal performance although using an economical seal member of a simple structure having no axial lip.

SUMMARY OF THE INVENTION

In order to attain the object, a sealing device on a side of an impeller of a water pump bearing is configured by using a pump shaft as an inner race, the impeller being attached to one end of the pump shaft, a pulley being attached to another end, and by externally attaching an outer race via rolling elements to an outer peripheral face of the pump shaft, wherein the sealing device comprises: an annular seal member which is fixed to a shoulder portion of one end in an axial direction of the outer race; and an annular slinger having an inner cylindrical portion and a disk portion which is extended in a radial direction, the inner cylindrical portion being positioned on a side of the one end in the axial direction with respect to the seal member and externally fitted and fixed to the outer peripheral face of the pump shaft, the seal member has a section shape which is bent along the disk portion of the slinger, and an outer cylindrical portion which is extended from an outer periphery of the disk portion toward the other end in the axial direction, a labyrinth seal portion is formed between the seal member, and the disk portion and the outer cylindrical portion of the slinger, and a radial lip is disposed on an inner periphery of the seal member.

In the sealing device for a water pump bearing, the economical seal member which is not provided with an axial lip and, which has only a radial lip is fixed to the shoulder portion of the outer race. However, the seal member has a section shape which is bent along the disk portion and the outer cylindrical portion of the slinger, and the labyrinth seal portion is formed between the seal member, and the disk portion and the outer cylindrical portion of the slinger. Although an axial lip is not disposed, therefore, the labyrinth seal portion and the radial lip alone can exhibit sufficient seal performance.

According to another feature of the sealing device of the invention, the radial lip of the seal member may be in contact with the outer peripheral face of the pump shaft, or placed in close proximity to the outer peripheral face of the pump shaft so as to form the labyrinth seal portion. Alternatively, the radial lip may be in contact with an outer peripheral face of the inner cylindrical portion of the slinger, or placed in close proximity to the outer peripheral face of the inner cylindrical portion of the slinger so as to form the labyrinth seal portion. In both the cases, excellent seal performance is exhibited by the radial lip and the formed labyrinth seal portion.

Another embodiment of the invention provides a sealing device on a side of an impeller of a water pump bearing configured by using a pump shaft as an inner race, the impeller being attached to one end of the pump shaft, a pulley being attached to another end, and by externally attaching an outer race via rolling elements to an outer peripheral face of the pump shaft, wherein the sealing device comprises: an annular seal member which is fixed to a shoulder portion of one end in an axial direction of the outer race; and an annular slinger having an inner cylindrical portion and a disk portion which is extended in a radial direction, the inner cylindrical portion being positioned on a side of the one end in the axial direction with respect to the seal member and externally fitted and fixed to the outer peripheral face of the pump shaft, the seal member has a section shape which is bent along the disk portion of the slinger, and an outer cylindrical portion which is extended from an outer periphery of the disk portion toward the other end in the axial direction, an expanded portion of an elastic member is formed in an axial direction of the bent portion, a labyrinth seal portion is formed between the expanded portion, and the disk portion and the outer cylindrical portion of the slinger, and a radial lip is disposed on an inner periphery of the seal member.

In the sealing device for a water pump bearing, the expanded portion disposed in the bent portion of the seal member can increase the distance in the axial direction of the labyrinth seal portion formed between the outer cylindrical portion and the expanded portion, and a process of bending a core constituting the seal member can be easily conducted. In accordance with another feature, the radial lip of the seal member may be in contact with the outer peripheral face of the pump shaft, or placed in close proximity to the outer peripheral face of the pump shaft so as to form the labyrinth seal portion. Alternatively, the radial lip may be in contact with an outer peripheral face of the inner cylindrical portion of the slinger, or placed in close proximity to the outer peripheral face of the inner cylindrical portion of the slinger so as to form the labyrinth seal portion. In both the cases, excellent seal performance is exhibited by the radial lip and the formed labyrinth seal portion.

BRIEF DESCRIPTION OF THE DRAWINGS

FIG. 2 is an enlarged section view of the upper half of the sealing device.

FIG. 2a is an enlarged section view of a portion of the upper half of the sealing device in which the radial lips of the seal member are shown placed in close proximity to the outer peripheral face of the pump shaft.

FIG. 3 is an enlarged section view of the upper half of a sealing device for a water pump bearing of a second embodiment of the invention.

FIG. 3a is an enlarged section view of a portion of the upper half of the sealing device in which the radial lips of the seal member are shown placed in close proximity to the outer peripheral face of the inner cylindrical portion of the slinger.

DETAILED DESCRIPTION OF THE PREFERRED EMBODIMENTS

Figure 1:
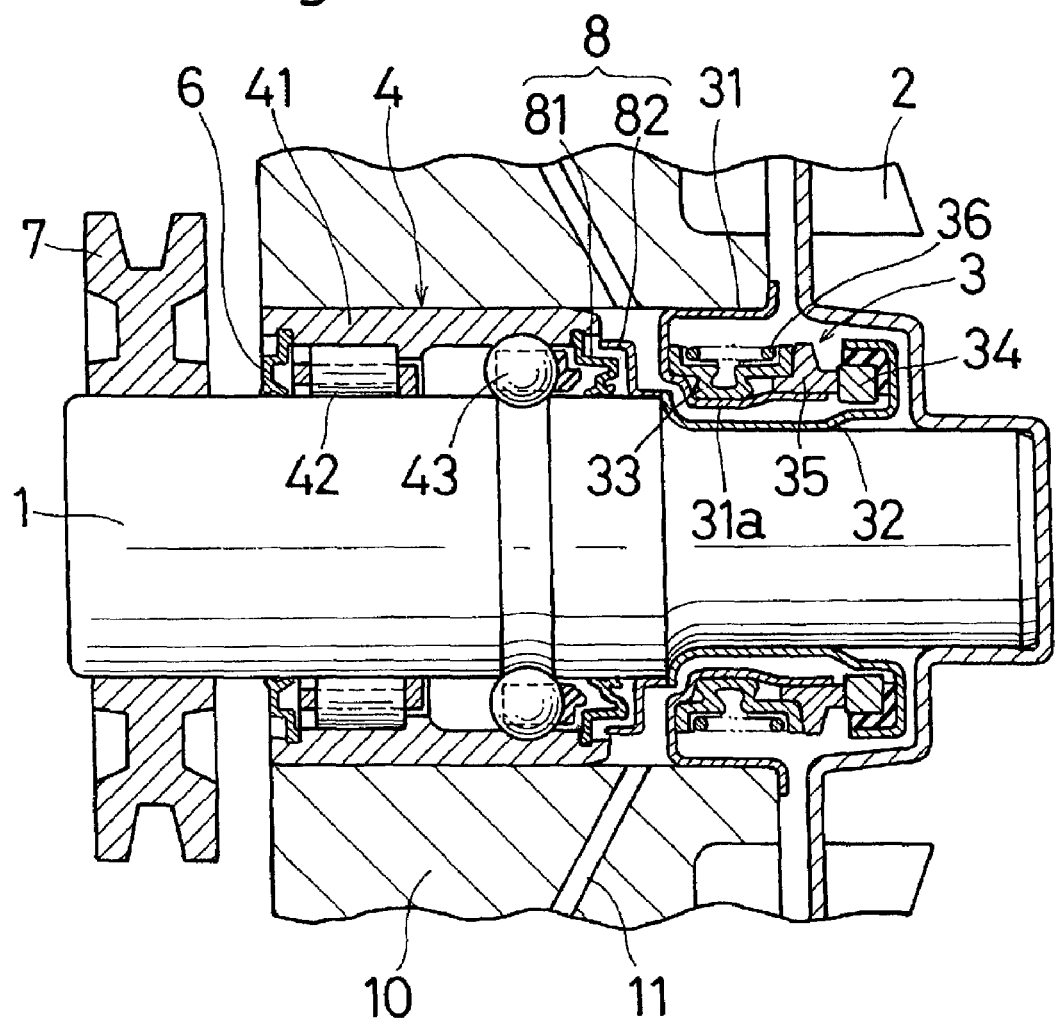
FIG. 1 is a partial section view showing the structure of a water pump into which a sealing device for a water pump bearing of a first embodiment of the invention is incorporated.

FIG. 1 is a partial section view showing the structure of a water pump into which a sealing device for a water pump bearing of a first embodiment of the invention is incorporated, and FIG. 2 is an enlarged section view of the upper half of the sealing device.

The water pump has the same structure as the above-described conventional water pump, with the exception of a sealing device 8 of a water pump bearing 4 on the side of the impeller 2, and comprises a pump shaft 1, an impeller 2, a mechanical seal 3, the water pump bearing 4, sealing devices 6 and 8 for the water pump bearing, a pulley 7, etc.

The pump shaft 1 has a small-diameter portion and a large-diameter portion. The mechanical seal 3 is disposed on the small-diameter portion, and the water pump bearing 4 is disposed on the large-diameter portion. The impeller 2 is attached to one end of the pump shaft 1, and the pulley 7 is attached to the other end. The pump shaft 1 and the impeller 2 are rotated by a belt (a belt which transmits rotation of a crankshaft of an engine) which is wound around the pulley 7, so that cooling water in a pump chamber is sent out.

The mechanical seal 3 is configured by: an outer annular member 31 which is internally fitted and fixed to a boss portion 10 of a pump housing; an inner annular member 32 which is externally fitted and fixed to the small-diameter portion of the pump shaft 1; a rubber sleeve 33 which is externally attached to an inner peripheral cylindrical portion 31a of the outer annular member 31; a rotary ring 34 which is disposed on a portion of the inner annular member 32 on the side of the impeller 2; a fixing ring 35 which is externally fitted to the inner peripheral cylindrical portion 31a of the outer annular member 31 so as to be slidable toward the impeller 2; and a coil spring 36 which is disposed in a compressed state on the outer periphery of the rubber sleeve 33, and which presses the fixing ring 35 against the rotary ring 34.

The water pump bearing 4 is a so-called integral shaft bearing, and uses the pump shaft 1 as an inner race. An outer race 41 is externally attached to the outer peripheral face of the large-diameter portion of the pump shaft 1 via a cylindrical roller group 42 and a ball group 43 which serve as rolling elements, and which are arranged in two rows in the axial direction. The outer race 41 is internally fitted and fixed to the boss portion 10 of the pump housing, and the sealing devices 6 and 8 are attached between the shoulder portions of the both ends in the axial direction of the inner peripheral face of the outer race 41, and the outer peripheral face of the large-diameter portion of the pump shaft 1.

The sealing device 6 on the side of the pulley 7 prevents entering of foreign materials and water from the outside, and is configured by a seal member which is fixed to a shoulder portion on the side of the other end (on the side of the pulley) in the axial direction of the outer race 41. By contrast, the sealing device 8 on the side of the impeller and according to the invention is used for, even when the cooling water leaks from the mechanical seal 3, blocking the cooling water from entering the water pump bearing 4, thereby allowing the cooling water to be discharged through a drain hole 11 of the boss portion 10. The sealing device 8 is configured by a seal member 81 and a slinger 82.

In the slinger 82 of the sealing device 8, as shown in FIG. 2, an inner cylindrical portion 82b is extended from an inner periphery of a disk portion 82a toward the one end (toward the impeller 2) in the axial direction, and an outer cylindrical portion 82c is extended from an outer periphery of the disk portion 82a toward the other end (toward the water pump bearing 4) in the axial direction, so that the slinger has a step-like section shape. The slinger is produced by conducting a pressing process on a rolled steel plate or the like. The slinger 82 is positioned on the side of the one end (on the side of the impeller) in the axial direction with respect to the seal member 81, and externally fitted and fixed to the outer peripheral face of the pump shaft 1. The tip end of the outer cylindrical portion 82c is in close proximity to an end of the outer race 41.

On the other hand, the seal member 81 is configured by integrally heat bonding an annular elastic member 81b in which two radial lips 81c and 81d are formed on the inner periphery, and which is made of synthetic rubber or the like, to an annular core 81a. An outer peripheral edge of the seal member is attached by means of engaging fixation to a shoulder portion 41a in one end of the axial direction of the outer race 41. The seal member 81 has a section shape in which an intermediate portion is bent into a substantially U-like shape so as to extend along the disk portion 82a and the outer cylindrical portion 82c of the slinger 82, whereby a labyrinth 83 of a sufficient length is formed between the seal member 81, and the disk portion 82a and the outer cylindrical portion 82c of the slinger 82. The two radial lips 81c and 81d of the seal member 81 are in contact with the outer peripheral face of the pump shaft 1.

In the thus configured sealing device 8, since the economical seal member 81 of the double lip type having no axial lip is used, the cost can be reduced. Since the labyrinth seal portion 83 of a sufficient length is formed between the seal member 81, and the disk portion 82a and the outer cylindrical portion 82c of the slinger 82, moreover, sufficient seal performance can be ensured by the labyrinth seal portion 83 and the two radial lips 81c and 81d even when an axial lip is not disposed.

In the embodiment described above, the two radial lips 81c and 81d of the seal member 81 are brought into contact with the outer peripheral face of the pump shaft 1. Alternatively, as shown for example in FIG. 2b, the radial lips 81c and 81d may be placed in close proximity to the outer peripheral face of the pump shaft 1 so that a labyrinth seal portion is formed between the radial lips 81c and 81d and the outer peripheral face of the pump shaft 1. In this case also, excellent seal performance is exhibited by the labyrinth seal portion formed between the radial lips 81c and 81d and the outer peripheral face of the pump shaft 1, and the above-mentioned labyrinth seal portion 83.

FIG. 3 is an enlarged section view of the upper half of a sealing device for a water pump bearing of a second embodiment of the invention.

In the slinger 82 of the sealing device 8, the inner cylindrical portion 82b and the outer cylindrical portion 82c are extended from the inner and outer peripheries of the disk portion 82a toward the other end (toward the water pump bearing 4) in the axial direction, respectively, so that the slinger has a substantially U-like section shape. The slinger is configured so that the two radial lips 81c and 81d on the inner periphery of the seal member 81 are in contact with the outer peripheral face of the inner cylindrical portion 82b.

The other configuration of the sealing device 8 is identical with that of the above-described sealing device. Therefore, the identical components are denoted by the same reference numerals in FIG. 3, and their description is omitted.

In the thus configured sealing device 8 also, since the economical seal member 81 of the double lip type having no axial lip is used, the cost can be reduced. Even when an axial lip is not disposed, sufficient seal performance can be ensured by the labyrinth seal portion 83 which is formed between the seal member 81, and the disk portion 82a and the outer cylindrical portion 82c of the slinger 82, and which has a sufficient length, and the two radial lips 81c and 81d.

In the sealing device also, as shown for example in FIG. 3a, the radial lips 81c and 81d may be placed in close proximity to the outer peripheral face of the inner cylindrical portion 82b so that a labyrinth seal portion is formed between the radial lips 81c and 81d and the outer peripheral face of the inner cylindrical portion 82b of the slinger, thereby allowing excellent seal performance to be exhibited by the labyrinth seal portion and the above-mentioned labyrinth 83.

Figure 4:
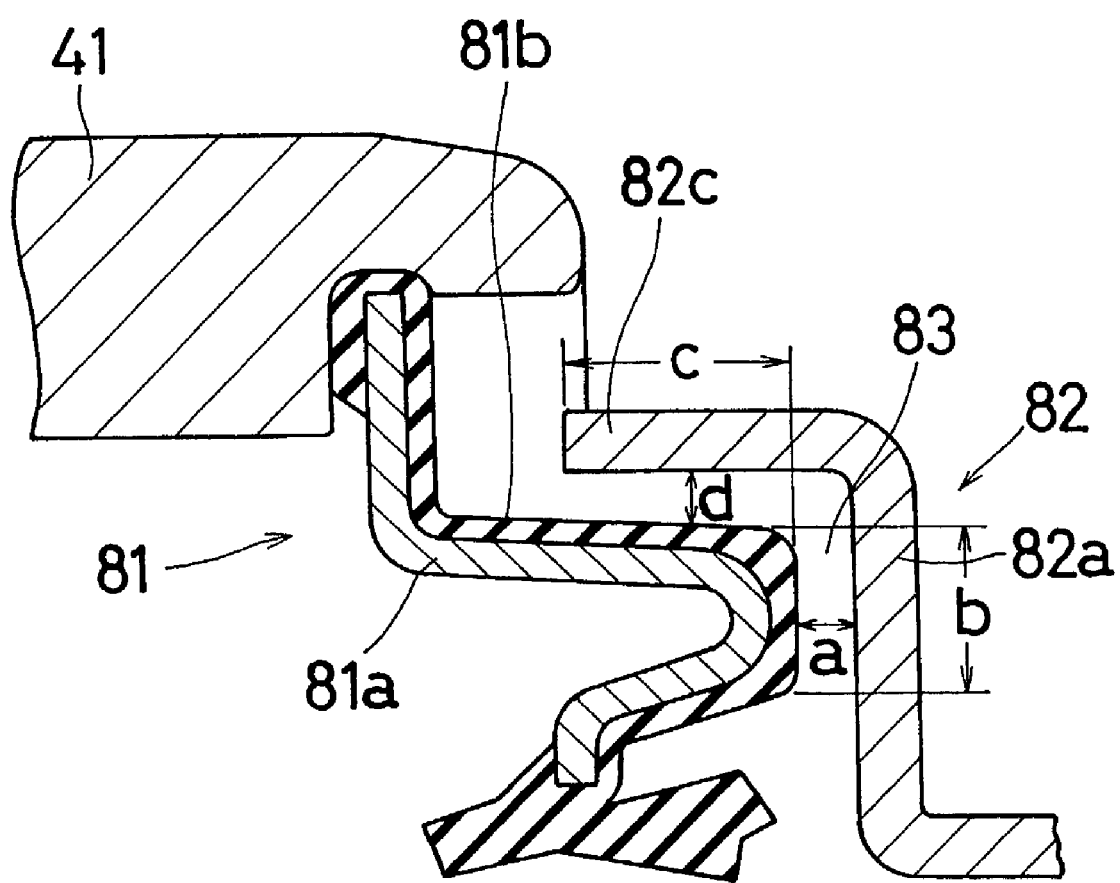
FIG. 4 is an enlarged view of a labyrinth seal portion which is formed by a seal member and a slinger in FIGS. 2 and 3.

Next, FIG. 4 is an enlarged view of the labyrinth seal portion which is formed by the seal member 81 and the slinger 82 in FIGS. 2 and 3. As described above, the labyrinth seal portion 83 is formed between the seal member 81, and the disk portion 82a and the outer cylindrical portion 82c of the slinger 82. In this case, the gap a in the axial direction of the labyrinth seal portion between the elastic member 81b in the axial-direction portion of a substantially U-like shape which is formed in the intermediate portion of the seal member 81, and the disk portion 82a is set to 0.05 to 0.8 mm, preferably, 0.2 mm to 0.8 mm, and the length b in a radial direction of the labyrinth seal portion is set to about 1 mm. Similarly, the length c in the axial direction of the labyrinth seal portion between the elastic member 81b in the lateral-direction portion of a substantially U-like shape which is formed in the intermediate portion of the seal member 81, and the outer cylindrical portion 82c is set to 1 mm or longer, and the gap d in a radial direction of the labyrinth seal portion is set to 0.05 to 1.0 mm, preferably, about 0.2 mm to 1.0 mm. In the portion of the core 81a on the side of the outer periphery of a substantially U-like shape of the seal member 81, a draft angle of about 3' is formed in the direction from the slinger 82 to the bearing 4.

Figure 5:
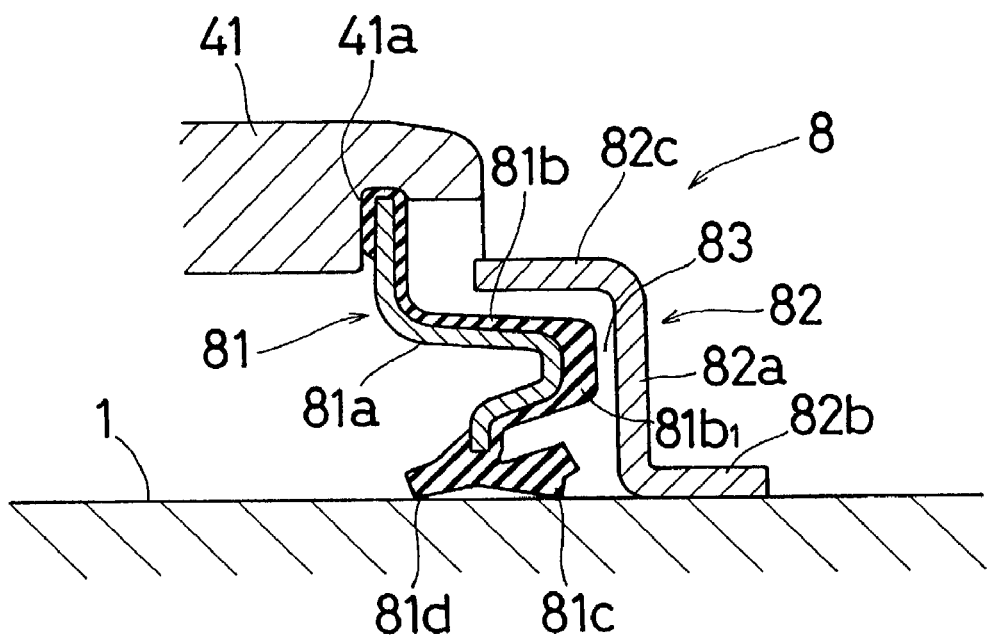
FIG. 5 is an enlarged section view of the upper half of a sealing device for a water pump bearing of a third embodiment of the invention.

Next, FIG. 5 is an enlarged section view of the upper half of a sealing device for a water pump bearing of a third embodiment of the invention. The embodiment is similar to the first embodiment. In the seal member 81, namely, an intermediate portion is formed so as to have a section shape which is bent into a substantially U-like shape, whereby the labyrinth 83 of a sufficient length is formed between the seal member 81, and the disk portion 82a and the outer cylindrical portion 82c of the slinger 82. In this case, an expanded portion 81b, in the axial direction in the elastic member 81b of the substantially U-like shape which is integrally heat bonded to the annular core 81a constituting the seal member 81 is formed to be thick. In order to increase the distance d (see FIG. 4) of the labyrinth seal portion in a radial direction between the elastic member 81b of the seal member 81 and the outer cylindrical portion 82c, the annular core 81a must be extremely bent. Therefore, this is difficult. Consequently, this is substituted with the formation of the axially-thick expanded portion 81b, which is the substantially U-like bent portion of the elastic member 81b that is integrally heat bonded to 81a. As a result, a process of bending the core 81a can be easily conducted, and the distance d of the labyrinth seal portion in a radial direction between the elastic member 81b and the outer cylindrical portion 82c can be easily increased.

Figure 6:
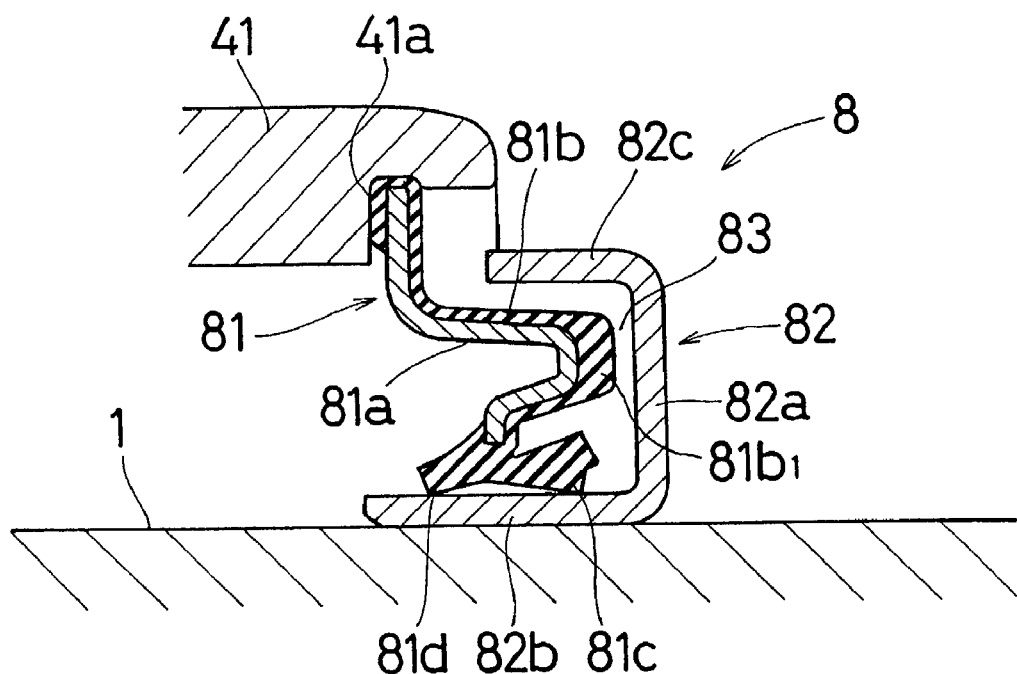
FIG. 6 is an enlarged section view of the upper half of a sealing device for a water pump bearing of a fourth embodiment of the invention.

FIG. 6 is an enlarged section view of the upper half of a sealing device for a water pump bearing of a fourth embodiment of the invention. The embodiment is similar to the second embodiment. In the slinger 82 of the sealing device 8, namely, the inner cylindrical portion 82b and the outer cylindrical portion 82c are extended from the inner and outer peripheries of the disk portion 82a toward the other end (toward the water pump bearing 4) in the axial direction, respectively, so that the slinger has a substantially U-like section shape. The slinger is configured so that the two radial lips 81c and 81d on the inner periphery of the seal member 81 are in contact with the outer peripheral face of the inner cylindrical portion 82b. In this case also, the axially-thick expanded portion 81b, of the bent portion of the substantially U-like shape in the elastic member 81b which is integrally heat bonded to the annular core 81a constituting the seal member 81 is formed. This case also is identical as the above-described third embodiment, and hence description is omitted.

Figure 7:
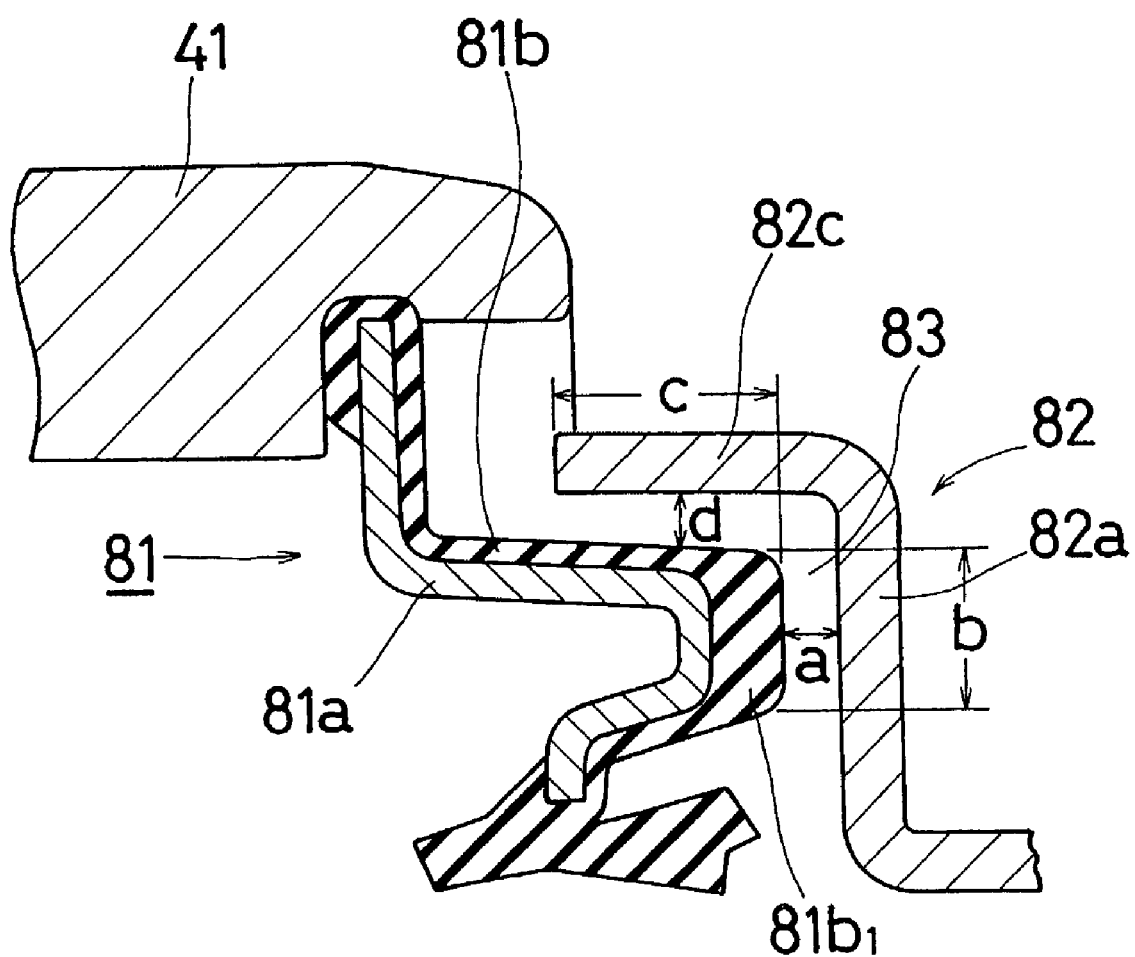
FIG. 7 is an enlarged view of a labyrinth seal portion which is formed by a seal member and a slinger in FIGS. 5 and 6.
Figure 8:
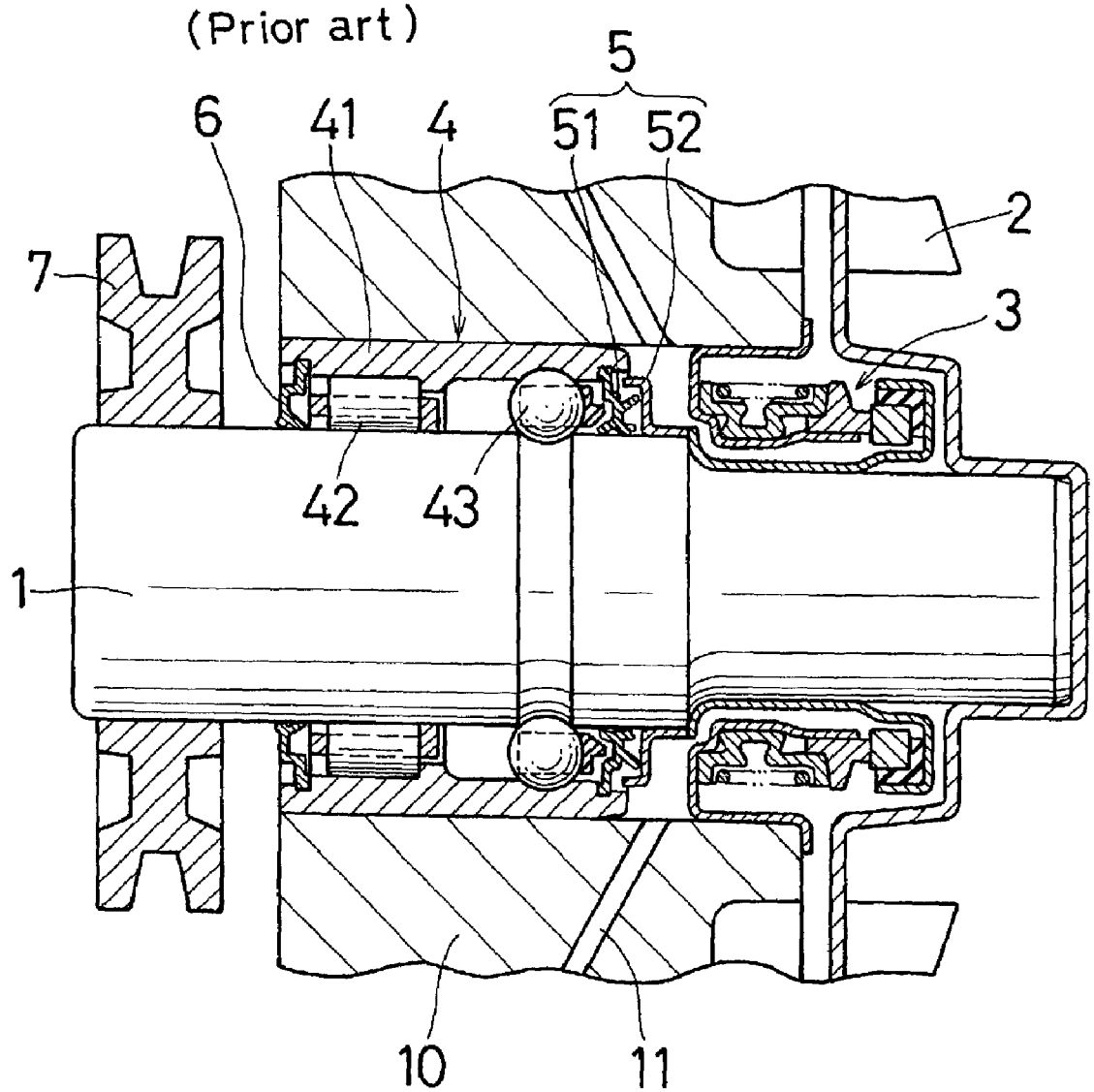
FIG. 8 is a partial section view showing the structure of a conventional water pump.
Figure 9:
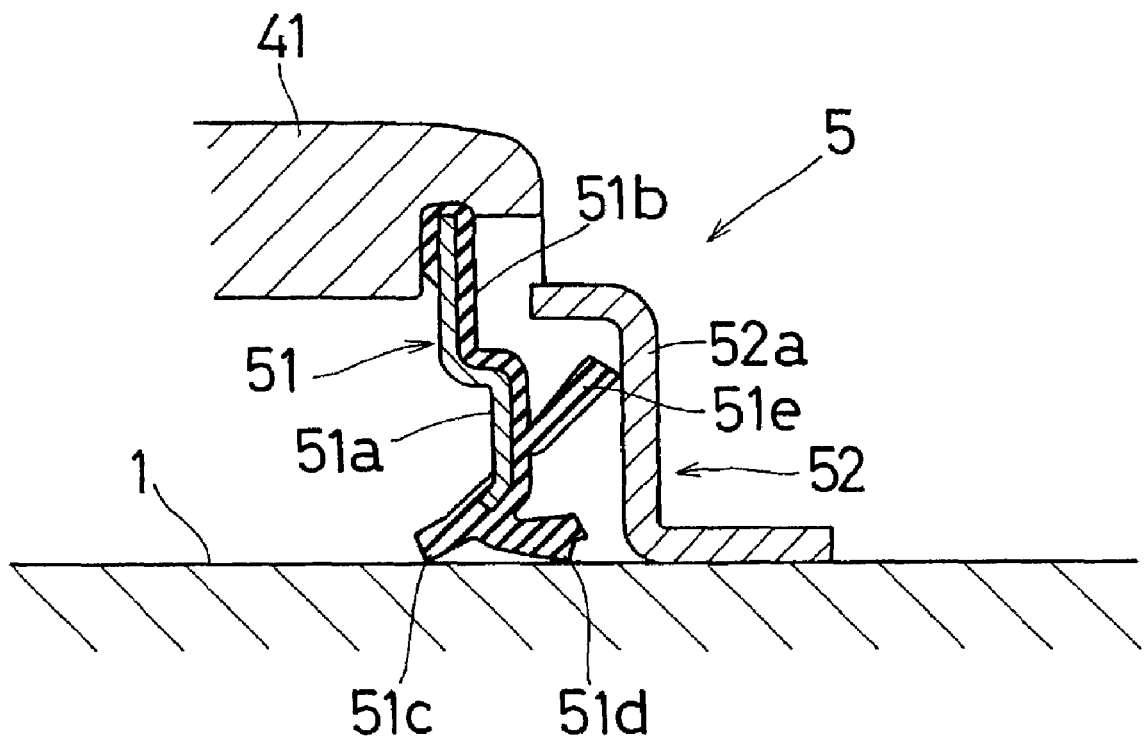
FIG. 9 is an enlarged section view of the upper half of a sealing device for a water pump bearing which is incorporated into a water pump.

Next, FIG. 7 is an enlarged view of a labyrinth seal portion which is formed by the seal member 81 and the slinger 82 in FIGS. 5 and 6. In this case also, the labyrinth seal portion 83 is formed between the seal member 81, and the disk portion 82a and the outer cylindrical portion 82c of the slinger 82. The gap a in the axial direction of the labyrinth seal portion between the elastic member 81b having the expanded portion 81b, in the axial-direction portion of a substantially U-like shape which is formed by bending in the intermediate portion of the seal member 81, and the disk portion 82a is set to 0.05 mm to 0.8 mm, preferably, 0.2 mm to 0.8 mm, and the length b in a radial direction of the labyrinth seal portion is set to about 1 mm. The length c in the axial direction of the labyrinth seal portion between the elastic member 81b in the lateral-direction portion which has the expanded portion 81b, of a substantially U-like shape, and the outer cylindrical portion 82c is set to 0.5 mm or longer, preferably, 1 mm or longer, and the gap d in a radial direction of the labyrinth seal portion is set to 0.05 to 1.0 mm, preferably, about 0.2 mm to 1.0 mm. In the portion of the core 81a on the side of the outer periphery of a substantially U-like shape of the seal member 81, a draft angle of about 30 is formed in the direction from the slinger 82 to the bearing 4.

In the above-described third and fourth embodiments also, the two radial lips 81c and 81d of the seal member 81 may be placed in close proximity to the outer peripheral face of the pump shaft 1 or that of the inner cylindrical portion 82b so that a labyrinth seal portion is formed between the radial lips and the outer peripheral face. In this case also, excellent seal performance can be exhibited by the labyrinth seal portion formed and the above-mentioned labyrinth seal portion 83.

As is apparent from the above description, the sealing device for a water pump bearing of the invention provides advantage in that a seal member having no axial lip is used and hence the cost can be reduced, and that, even when an axial lip is not disposed, sufficient seal performance can be ensured by a labyrinth seal portion formed between the seal member, and an annular plate portion and an outer cylindrical portion of a slinger, and a radial lip on the inner periphery of the seal member.

The invention claimed is:

1. A sealing device for use on a side of an impeller of a water pump bearing configured by using a pump shaft as an inner race, said impeller being attached to one end of said pump shaft, a pulley being attached to an other end of said pump shaft, and by externally attaching an outer race via rolling elements to an outer peripheral face of said pump shaft, the sealing device comprising:
    an annular slinger having an inner cylindrical portion, a disk portion which is extended in a radial direction, and an outer cylindrical portion which is extended from an outer periphery of said disk portion toward said other end of said pump shaft in an axial direction, said inner cylindrical portion being positioned axially adjacent to a shoulder portion provided at a one end of said outer race in the axial direction and externally fitted and fixed to said outer peripheral face of said pump shaft;
    an annular seal member which is fixed to said shoulder portion, an intermediate portion of said seal member having a section shape which is bent into an approximate U-shape in a region corresponding radially along said disk portion of said slinger, a closed end of said approximate U-shape extending axially from a remainder of said annular seal member in a direction towards said disk portion such that a labyrinth seal portion is thereby formed between said seal member, and said disk portion and said outer cylindrical portion of said slinger, said annular seal member further including at least one radial lip disposed on an inner periphery of said seat member, said labyrinth seal portion defining a gap between said seal member and said slinger which extends continuously from said inner periphery of said seal member to said outer cylindrical portion of said slinger; and
    said annular seal being without a lip projection extending from said intermediate portion to said slinger.

2. A sealing device according to claim 1, wherein said at least one radial lip of said seal member is one of in contact with and in close proximity to said outer peripheral face of said pump shaft so as to form said labyrinth seal portion.

3. A sealing device according to claim 1, wherein said inner cylindrical portion of said slinger is extended from an inner periphery of said disk portion toward said other end of said pump shaft in the axial direction, and said at least one radial lip of said seal member is one of in contact with and in close proximity to an outer peripheral face of said inner cylindrical portion of said slinger, so as to form said labyrinth seal portion.

4. A sealing device for use on a side of an impeller of a water pump bearing configured by using a pump shaft as an inner race, said impeller being attached to one end of said pump shaft, a pulley being attached to an other end of said pump shaft, and by externally attaching an outer race via rolling elements to an outer peripheral face of said pump shaft, the sealing device comprising:
    an annular slinger having an inner cylindrical portion, a disk portion which is extended in a radial direction, and an outer cylindrical portion which is extended from an outer periphery of said disk portion toward said other end of said pump shaft in an axial direction, said inner cylindrical portion being positioned axially adjacent to a shoulder portion provided at a one end of said outer race in the axial direction and externally fitted and fixed to said outer peripheral face of said pump shaft;
    an annular seal member which is fixed to said shoulder portion, an intermediate portion of said seal member having a section shape which includes a bent portion having an approximate U-shape in a region corresponding radially along said disk portion of said slinger, a closed end of said approximate U-shape extending axially from a remainder of said annular seal member in a direction towards said disk portion, said annular seal member including an elastic member integral therewith, said elastic member including an expanded portion formed in the axial direction of said bent portion positionally corresponding to the closed end of said approximate U-shape, a labyrinth seal portion being thereby formed between said expanded portion, and said disk portion and said outer cylindrical portion of said slinger, said annular seal member further including at least one radial lip disposed on an inner periphery of said seal member, said labyrinth seal portion defining a gap between said seal member and said slinger which extends continuously from said inner periphery of said seal member to said outer cylindrical portion of said slinger; and
    said annular seal being without a lip projection extending from said intermediate portion to said slinger.

5. A sealing device according to claim 4, wherein said at least one radial lip of said seal member is one of in contact with and in close proximity to said outer peripheral face of said pump shaft so as to form said labyrinth seal portion.

6. A sealing device according to claim 4, wherein said inner cylindrical portion of said slinger is extended from an inner periphery of said disk portion toward said other end of said pump shaft in the axial direction, and said at least one radial lip of said seal member is one of in contact with and in close proximity to an outer peripheral face of said inner cylindrical portion of said slinger, so as to form said labyrinth seal portion.

7. A sealing device for use on a side of an impeller of a water pump bearing configured by using a pump shaft as an inner race, said impeller being attached to one end of said pump shaft, a pulley being attached to an other end of said pump shaft, and by externally attaching an outer race via rolling elements to an outer peripheral face of said pump shaft, the sealing device comprising:
an annular slinger having an inner cylindrical portion, a disk portion which is extended in a radial direction, and an outer cylindrical portion which is extended from an outer periphery of said disk portion toward said other end of said pump shaft in an axial direction, said inner cylindrical portion being positioned axially adjacent to a shoulder portion provided at a one end of said outer race in the axial direction and externally fitted and fixed to said outer peripheral face of said pump shaft; and
an annular seal member which is fixed to said shoulder portion, an intermediate position of said seal member having a section shape which includes a bent portion having an approximate U-shape in a region corresponding radially along said disk portion of said slinger, a closed end of said approximate U-shape extending axially from a remainder of said annular seal member in a direction towards said disk portion such that a labyrinth seal portion is thereby formed between said seal member, and said disk portion and said outer cylindrical portion of said slinger in such a manner that at least a portion of said labyrinth seal portion extends radially between said bent portion of said seal member and said disk portion of said slinger, said annular seal member further including at least one radial lip disposed on an inner periphery of said seal member; and
said annular seal being without a lip projection extending from said intermediate portion to said slinger.

8. A sealing device according to claim 7, wherein said annular seal member includes an elastic member integral therewith, said elastic member including an expanded portion formed in the axial direction of said bent portion positionally corresponding to the closed end of said approximate U-shape, said at least a portion of said labyrinth seal portion which extends radially between said bent portion of said seal member and said disk portion of said slinger being defined by a gap formed between said expanded portion and said disk portion of said slinger.

9. A sealing device according to claim 8, wherein:
said gap has a width in the axial direction in a range of about 0.05 mm to about 0.8 mm, and a length in the radial direction of about 1 mm; and
an other portion of said labyrinth seal portion extends axially between said bent portion of said seal member and said outer cylindrical portion of said slinger, said other portion being defined by an other gap having a length in the axial direction of at least about 1 mm, and a width in the radial direction in a range of about 0.05 mm to about 1 mm.

10. A sealing device according to claim 8, wherein:
said gap has a width in the axial direction in a range of about 0.2 mm to about 0.8 mm, and a length in the radial direction of about 1 mm; and
an other portion of said labyrinth seal portion extends axially between said bent portion of said seal member and said outer cylindrical portion of said slinger, said other portion being defined by a gap having a length in the axial direction of at least about 1 mm, and a width in the radial direction in a range of about 0.2 mm to about 1 mm.

11. A sealing device according to claim 8, wherein an outer peripheral portion of the bent portion of the seal member which extends in a direction from the slinger to the bearing is formed with a draft angle of about 3°.

12. A sealing device according to claim 7, wherein said at least one radial lip of said seal member is one of in contact with and in close proximity to said outer peripheral face of said pump shaft so as to form said labyrinth seal portion.

13. A sealing device according to claim 7, wherein said inner cylindrical portion of said slinger is extended from an inner periphery of said disk portion toward said other end of said pump shaft in the axial direction, and said at east one radial lip of said seal member is one of in contact with and in close proximity to an outer peripheral face of said inner cylindrical portion of said slinger, so as to form said labyrinth seal portion.

14. A sealing device according to claim 7, wherein:
said at least a portion of said labyrinth seal portion which extends radially between said bent portion of said seal member and said disk portion of said slinger is defined by a gap having a width in the axial direction in a range of about 0.05 mm to about 0.8 mm, and a length in the radial direction of about 1 mm; and
an other portion of said labyrinth seal portion extends axially between said bent portion of said seal member and said outer cylindrical portion of said slinger, said other portion being defined by a gap having a length in the axial direction of at least about 1 mm, and a width in the radial direction in a range of about 0.05 mm to about 1 mm.

15. A sealing device according to claim 7, wherein:
said at least a portion of said labyrinth seal portion which extends radially between said bent portion of said seal member and said disk portion of said slinger is defined by a gap having a width in the axial direction in a range of about 0.2 mm to about 0.8 mm, and a length in the radial direction of about 1 mm; and
an other portion of said labyrinth seal portion extends axially between said bent portion of said seal member and said outer cylindrical portion of said slinger, said other portion being defined by a gap having a length in the axial direction of at least about 1 mm, and a width in the radial direction in a range of about 0.2 mm to about 1 mm.

16. A sealing device according to claim 7, wherein an outer peripheral portion of the bent portion of the seal member which extends in a direction from the slinger to the bearing is formed with a draft angle of about 3°.

* * * * *